United States Patent
Madian et al.

(10) Patent No.: US 12,052,582 B2
(45) Date of Patent: Jul. 30, 2024

(54) DOWNTIME OPTIMIZED NETWORK UPGRADE PROCESS

(71) Applicant: T-Mobile Innovations LLC, Overland Park, KS (US)

(72) Inventors: Jacob Matthew Madian, Seattle, WA (US); Ramesh Venkata Josyula, Redmond, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 297 days.

(21) Appl. No.: 17/525,374

(22) Filed: Nov. 12, 2021

(65) Prior Publication Data
US 2023/0156481 A1    May 18, 2023

(51) Int. Cl.
*H04W 16/18* (2009.01)
*H04W 24/08* (2009.01)

(52) U.S. Cl.
CPC ........... *H04W 16/18* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 11,797,951 B2* | 10/2023 | Colena | G06Q 10/06312 |
| 2008/0320149 A1* | 12/2008 | Faccin | H04L 67/14 |
| | | | 709/228 |
| 2017/0278312 A1* | 9/2017 | Minster | G05D 1/0297 |
| 2017/0345040 A1* | 11/2017 | Pirnack | G06F 3/0481 |
| 2019/0266056 A1* | 8/2019 | Wu | G06F 9/3891 |
| 2019/0278856 A9* | 9/2019 | Yam | G06F 8/65 |
| 2020/0074412 A1* | 3/2020 | Colena | G06N 5/01 |
| 2021/0124570 A1* | 4/2021 | A | H04L 41/04 |
| 2021/0160124 A1* | 5/2021 | Yan | H04L 41/5009 |
| 2021/0303177 A1* | 9/2021 | Kanjirathinkal | G06F 3/0604 |

* cited by examiner

*Primary Examiner* — Phirin Sam
(74) *Attorney, Agent, or Firm* — Shook, Hardy & Bacon L.L.P.

(57) ABSTRACT

Systems and methods for generating one or more candidate maintenance windows of at least one cell site of a telecommunications network include a user device and a cell site communicatively coupled to a service management system. The service management system is structured to receive a maintenance request to upgrade the cell site, the maintenance request including a maintenance requirement. The service management system is structured to aggregate one or more network parameters based on the cell site and generate one or more candidate maintenance windows based on the one or more network parameters aggregated and the maintenance requirement. The one or more candidate maintenance windows identify one or more downtime upgrade periods correlating to the cell site.

19 Claims, 4 Drawing Sheets

DOWNTIME OPTIMIZED NETWORK UPGRADE PROCESS

SUMMARY

The present disclosure is directed, in part, to identifying one or more candidate maintenance windows of at least one cell site of a telecommunications network, substantially as shown in and/or described in connection with at least one of the figures, and as set forth more completely in the claims.

In aspects set forth herein, a user device is connected to a telecommunication network. Typically, vendors and operators perform service impacting work to a cell site when network activity is as low as possible. This usually takes place when the affected area is sleeping. With the continual adoption of technology, even at night, network impact is inevitable. However, here, a service management system receives a maintenance request to upgrade at least one cell site and identifies one or more candidate maintenance windows and one or more confidence indicators which minimizes network performance impact during critical maintenance upgrades.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
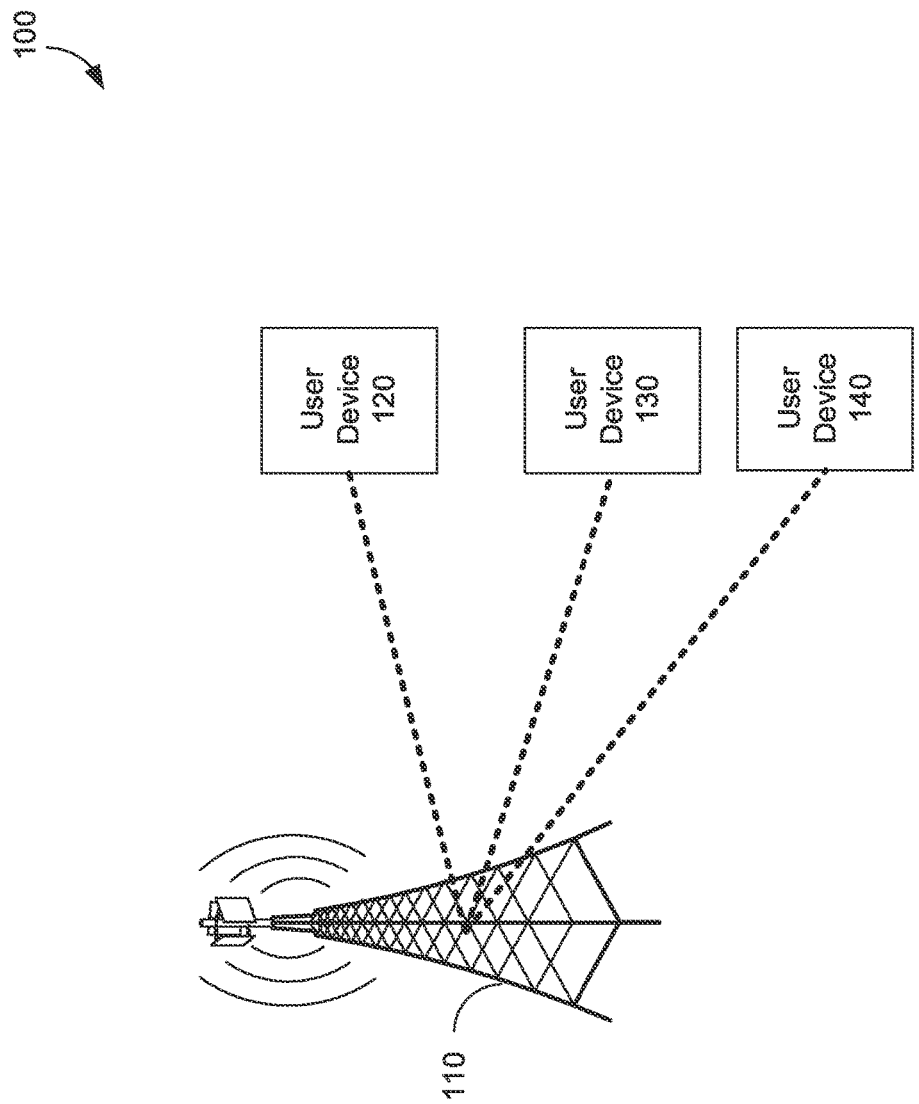
FIG. 1 depicts an example of a network environment in accordance with one or more embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for generating one or more candidate maintenance windows of at least one cell site of a telecommunications network. A maintenance request to upgrade at least one cell site is received. One or more network parameters associated with the at least one cell site are aggregated. One or more candidate maintenance windows are generated based on the one or more network parameters aggregated and the maintenance requirement. The one or more candidate maintenance windows identify one or more downtime upgrade periods correlating to the at least one cell site.

Advantageously, generating candidate maintenance window(s) optimize the downtime of a network during an upgrade of a cell site by reducing network performance impacts to a minimal number of end users.

In one aspect, a method is provided for generating one or more candidate maintenance windows of at least one cell site of a telecommunications network. The method includes receiving, by a service management system communicatively coupled to at least one cell site, a maintenance request to upgrade the at least one cell site, the maintenance request including a maintenance requirement. The method also includes aggregating one or more network parameters associated with the at least one cell site. The method further includes generating one or more candidate maintenance windows based on the one or more network parameters aggregated and the maintenance requirement, wherein the one or more candidate maintenance windows identify one or more downtime upgrade periods correlating to the at least one cell site.

In another aspect, a computer-readable storage media having computer-executable instructions embodied thereon is provided that, when executed by one or more processors, cause the processors to perform various steps. The processors are caused to receive, by a service management system communicatively coupled to at least one cell site, a maintenance request to upgrade the at least one cell site, the maintenance request including a maintenance requirement. The processors are also caused to aggregate one or more network parameters based on the at least one cell site. The processors are further caused to generate one or more candidate maintenance windows and one or more confidence indicators based on the one or more network parameters aggregated and the maintenance requirement, wherein the one or more candidate maintenance windows identify one or more downtime upgrade periods correlating to the at least one cell site.

In yet another aspect, a system is provided for generating one or more candidate maintenance windows of at least one cell site of a telecommunications network. The system includes a user device and a cell site communicatively coupled to a service management system and the user device. The service management system receives a maintenance request to upgrade the cell site, the maintenance request including a maintenance requirement. The service management system also aggregates one or more network parameters based on the cell site. The service management system further generates one or more candidate maintenance windows based on the one or more network parameters aggregated and the maintenance requirement, wherein the one or more candidate maintenance windows identify one or more downtime upgrade periods correlating to the cell site.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, nontransitory and transitory media, removable and non-removable media, and contemplate media readable by a database, a switch, and various other network devices. Computer-readable media includes media implemented in any way for storing information. Examples of stored information include computer-useable instructions, data structures, programmatic circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 400 shown in FIG. 4. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, the UE may take on any variety of devices, such as a personal computer, laptop computer, tablet, netbook, mobile phone, smart phone, personal digital assistant, wearable device, augmented reality device, fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using 5G or 6G and having backward compatibility with prior access technologies, current UE capable of using 5G or 6G and lacking backward compatibility with prior access technologies, and legacy UE that is not capable of using 5G or 6G.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 120, 130, and 140. In some embodiments, the network environment 100 may include a telecom network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The telecom network included in the network environment 100 may include or otherwise may be accessible through a cell site (e.g., the cell site 110). The cell site may include one or more antennas, base transmitter stations, radios, transmitter/receivers, digital signal processors, control electronics, GPS equipment, power cabinets or power supply, base stations, charging stations, etc. such that the cell site may provide a communication link between one or more user devices (e.g., the user devices such as the user devices 120, 130, and 140) and other components, systems, equipment, and/or devices of the network environment 100. The base station and/or a computing device (e.g., whether local or remote) associated with the base station may manage or otherwise control the operations of components of the cell site.

In some embodiments, the cell site may be operable in a non-stand alone (NSA) mode. In the non-stand alone mode the network environment 100 may take the form of, for example, an E-UTRAN New Radio-Dual Connectivity (EN-DC) network. In an EN-DC network, a user device may connect to or otherwise access a 4G, LTE, 5G, or any other suitable network. In the stand alone mode, the telecom network may take the form of a 5G, 6G, or any other suitable network.

In some embodiments, the network environment 100 may include one or more nodes communicatively coupled to one or more user devices such that the node(s) may transmit to and receive requests and/or data from the user device(s). The one or more nodes may include a Next Generation Node B (e.g., gNodeB or gNB) or any other suitable node. The one or more nodes may correspond to one or more frequency bands within which the user device(s) may connect to the network environment such as, but not limited to, a telecommunication network or a portion thereof.

In some embodiments, the node(s) may be included within the cell site (e.g., the cell site 110), external to the cell site, or otherwise communicatively coupled to the cell site. The node(s) may allocate radio frequency, or a portion thereof, to user device(s).

In some embodiments, the user device(s) may take the form of a wireless or mobile device capable of communication via the network environment 100. For example, the user device 120 may take the form of a mobile device capable of communication via a telecom network such as, but not limited to, a wireless telecommunication network. In this regard, the user device(s) may be any computing device that communicates by way of a network, for example, a 4G, LTE, WiMAX, Wi-Fi, 5G, 6G, or any other type of network.

In some embodiments, the network environment 100 may connect subscribers (e.g., current subscribers and/or potential subscribers) to a service provider or a plurality of service providers. Alternatively or additionally, the network environment 100 may be associated with a specific telecommunication provider or a plurality of telecommunication providers that provide services (e.g. 5G, 6G, voice, location, data, etc.) to one or more user devices. For example, the user devices 120 and 130 may be subscribers to a telecommunication service provider, in which the devices are registered or subscribed to receive voice and data services (e.g., receive content that may be streamed, downloaded, etc.) over the network environment 100. The network environment 100 may include any communication network providing voice and/or data service(s), such as, for example, a Wi-Fi network, 4G network (LTE, WiMAX, HSDPA), 5G network, or 6G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
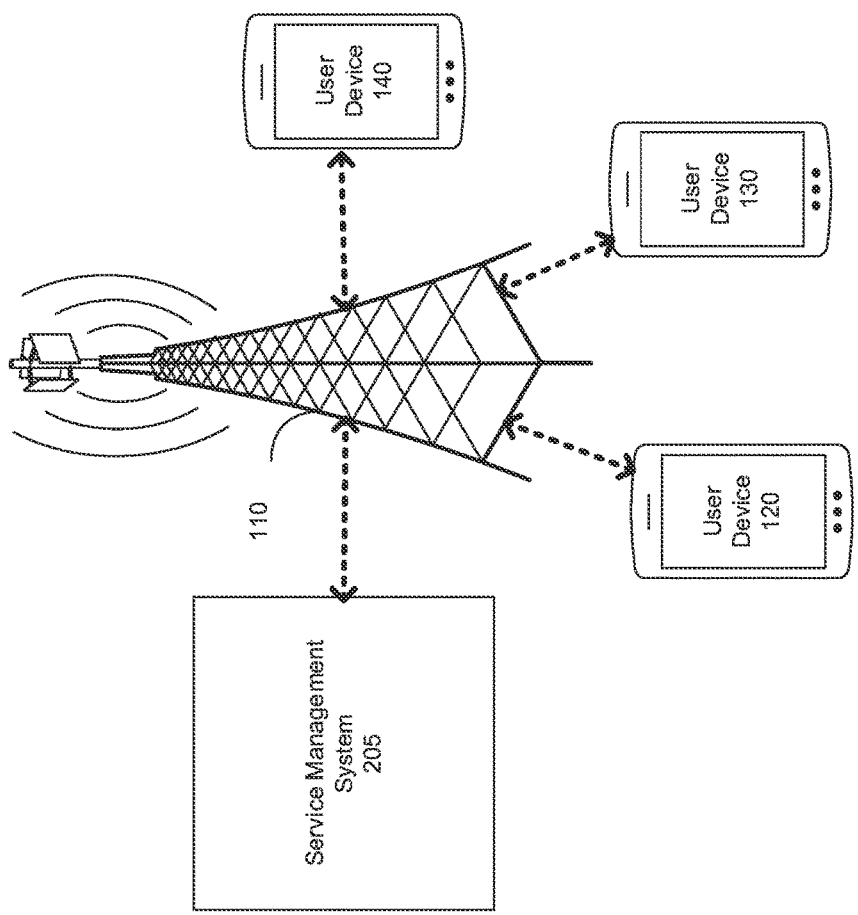
FIG. 2 is a diagram of a network environment including service management system in accordance with an example embodiment.

FIG. 2 is a diagram of the network environment 200 (e.g., a telecommunication environment such as, but not limited to, a wireless telecommunication environment) according to an example embodiment. In the present embodiment, the network environment 200 includes the cell site 110, service management system 205, and user devices 120, 130, and 140. Although some of the components in the network environment 200 are depicted as single components (e.g., a single service management system, cell site, etc.), in some embodiments, the network environment 200 may include a plurality of such components. The service management system 205 may be included within the cell site 110, external to the cell site 110, and/or otherwise communicatively coupled to the cell site 110 directly or indirectly.

In some embodiments, the service management system (e.g., the service management system 205) may receive a maintenance request to upgrade at least one cell site (e.g., the cell site 110). As used herein, the term "maintenance request" may be used to refer to a request to upgrade a cell site. The maintenance request may include at least one maintenance requirement (e.g., at least one of a schedule requirement, footprint requirement, or any other suitable requirement). In some embodiments, the schedule requirement may include one or more timing inputs (e.g., upgrade window, upgrade shutout, priority timing, maximum upgrade timing, etc.). The upgrade window may define the window of time during which a single upgrade or a plurality of upgrades may occur. In this regard, the maintenance requirement may include or otherwise may take the form of an upgrade window, upgrade shutout, priority timing, maximum upgrade time, and/or any other suitable requirement. Alternatively or additionally, the timing input (e.g., upgrade shutout) may identify one or more dates or times when an upgrade is not allowed. In some examples, the timing input (e.g., priority timing) may associate a weight to one or more specific dates and/or specific times. The timing input (e.g., maximum upgrade time) may define the maximum time allowed for an upgrade before a required rollback.

The maintenance requirement may include one or more footprint requirements. The footprint requirement may include or otherwise take the form of a RAN (Radio Access Network) input, footprint input, and/or rollback requirement. The RAN input may include a RAT (Radio Access Technology) selection (e.g., 2G, 3G, 4G, 5G, internet of things (IoT), etc.), frequency selection, baseband type, vendor input, and/or any other suitable RAN input. The footprint input may indicate the number of cell sites that may be included in an upgrade. For example, the footprint input may indicate an upgrade area level (e.g., cell site, type allocation code (TAC), market, etc.). The type allocation code may be an identifier that refers to the type of user equipment. In further embodiments, the rollback requirement may identify allowed truck rolls (e.g., the number of site visits that may be allowed to fix issues encountered during an upgrade), a layer availability (e.g., a minimum and/or maximum layer availability), and/or one or more thresholds (e.g., one or more rollback thresholds). Exceeding the number of allowed truck rolls may result in a rollback or may prohibit one or more upgrades from taking place (e.g., a site completed stays completed). In some embodiments, the rollback requirement may be included in the maintenance request (e.g., included in an initial maintenance request). Truck roll(s) may indicate the number of site visits that may be required to recover equipment if there is an issue encountered during the upgrade. In some examples, a market may permit a maximum number of truck rolls such that no more upgrades may occur during a maintenance window. The layer availability (e.g., a minimum layer availability) may indicate the available frequency layers required. The layer availability may ensure the end user (e.g., the consumer) experience during the upgrade period. In some examples, the one or more thresholds (e.g., one or more rollback thresholds) may indicate a change in drops (e.g., an increase in VoLTE/VoNR drops), throughput (e.g., a decrease in throughput), etc. The service management system may determine when to rollback an upgrade based on the one or more thresholds.

In some embodiments, the maintenance request may be received via a user interface. The user interface may include an image, button, drop down, menu, field, graphic, and/or any other suitable component that initiates the receipt of input corresponding to the maintenance request.

In some embodiments, the service management system may aggregate one or more network parameters associated with the at least one cell site. The service management system may receive the network parameter(s) based on the activity at the cell site(s). The one or more network parameters may include one or more performance indicators. As used herein, the term "performance indicator" may include a key performance indicator (KPI) such as, but not limited to, data traffic, voice traffic, and/or any other suitable indicator. The voice traffic may be based on calls such as, but not limited to, E911, Voice over LTE (VoLTE), Video over LTE (ViLTE), Voice over 5G (VoNR), Video over 5G (ViNR), erlangs (e.g., VoLTE, ViLTE, VoNR, and/or ViNR erlangs), drops (e.g., VoLTE, ViLTE, VoNR, and/or ViNR drops), and/or any other suitable voice traffic indicator. In some examples, the performance indicator (e.g., voice traffic such as, but not limited to, VoLTE, ViLTE, VoNR, and/or ViNR calls) may indicate customer calling trends and/or patterns. In some examples, the performance indicator (e.g., voice traffic such as, but not limited to, VoLTE, ViLTE, VoNR, and/or ViNR erlangs) may indicate network calling capacity. The performance indicator, in some examples, (e.g., voice traffic such as, but not limited to, VoLTE, ViLTE, VoNR, and/or ViNR drops) may indicate a period corresponding to a dropped call (e.g., a consistent period for dropped calls). The performance indicator (e.g., E911 calls) may indicate common high-priority traffic timing.

In some embodiments, the data traffic may be based on downlink traffic volume (e.g., LTE and/or NR), uplink traffic volume (e.g., LTE and/or NR), average user device throughput (e.g., LTE and/or NR), downlink PRB (Physical Resource Block) utilization, uplink PRB utilization, and/or any other suitable data traffic indicator. In some examples, the performance indicator (e.g., data traffic such as, but not limited to, downlink traffic volume) may indicate common data traffic timing. In some examples, the performance indicator (e.g., data traffic such as, but not limited to, uplink traffic volume) may indicate common data traffic timing. The performance indicator, in some examples, (e.g., data traffic such as, but not limited to, average user device throughput) may indicate user experience throughput trend(s). The performance indicator (e.g., downlink PRB utilization and/or uplink PRB utilization) may indicate network capacity tracking.

The service management system may learn and/or analyze the one or more network parameters. In some embodiments, the network parameter(s) may be aggregated and/or analyzed based on a single cell site or a plurality of cell sites.

In some examples, the service management system may generate one or more candidate maintenance windows based on the one or more network parameters aggregated and the maintenance requirement. The one or more candidate maintenance windows may identify one or more downtime upgrade periods correlating to at least one cell site. For example, the candidate maintenance windows generated may identify the candidate maintenance windows "4/28-10 PM-12 AM," "4/29-3 AM-7 AM," and/or "4/30-1 PM-4 PM" that correlate to the cell site 110. The candidate maintenance window(s) may be generated in real-time or near real-time.

In some embodiments, the service management system may be structured to generate one or more confidence indicators. As used herein, the term "confidence indicator" may be used to refer to the likelihood that the maintenance window is not likely to result in reduction of performance indicators beyond a given performance threshold (e.g., beyond a given performance amount). Alternatively or additionally, the confidence indicator may indicate that within the maintenance window (e.g., within the specified allowed dates) it is the best time for the upgrade to occur. For example, the service management system may generate a confidence indicator "95%" for the candidate maintenance window "4/28-10 PM-12 AM," a confidence indicator "91%" for the candidate maintenance window "4/29-3 AM-7 AM," and/or a confidence indicator "83%" for the candidate maintenance window "4/30-1 PM-4 PM." The confidence indicator(s) may take the form of one or more dynamic indicators that may update or otherwise change in value and/or weight as the candidate maintenance window approaches. Advantageously, the generation of the candidate maintenance window(s) optimizes the downtime of the network corresponding to one or more cell sites during an upgrade such that network performance impacts are reduced.

In some embodiments, the service management system may provide the candidate maintenance window(s) and/or the confidence indicator(s) to one or more user devices. The user device(s), via one or more user interfaces, may output, render, or otherwise display the candidate maintenance window(s) and/or the confidence indicator(s).

The service management system may be structured to generate a pre-check (e.g., a pre-upgrade check). The pre-check may be generated automatically or on-demand. The pre-check may be generated to alert the user of one or more cell sites that may or may not be in-sync (e.g., reached remotely), storage is available, etc. For example, the service management system may determine whether one or more nodes are in-sync, storage is available for an upgrade, etc. during the pre-check. In some examples, the service management system may determine whether one or more alarms are active or inactive during the pre-check. The service management system may provide the status of one or more parameters (e.g., the one or more nodes, storage availability, one or more alarms, etc.) determined during the pre-check to one or more user devices. The user device(s), via one or more user interfaces, may output, render, or otherwise display the status of the one or more parameters determined during the pre-check.

The service management system may be structured to generate a post-check. The post-check may be generated automatically or on-demand. In some embodiments, the service management system may determine whether one or more nodes have been upgraded. In some embodiments, the service management system 205 may determine the number of cell sites that are in an inactive state (e.g., a down state) to generate the post-check. In some examples, the service management system may determine the number of truck rolls per market to generate the post-check. If the cell site 110 is upgraded, the service management system 205 may generate a cleanup recommendation (e.g., a cleanup list that includes a list of sites unsuccessfully upgraded that require additional upgrade attempts). The service management system 205 may provide the post-check to one or more user devices. The user device(s), via one or more user interfaces, may output, render, or otherwise display the post-check.

Figure 3:
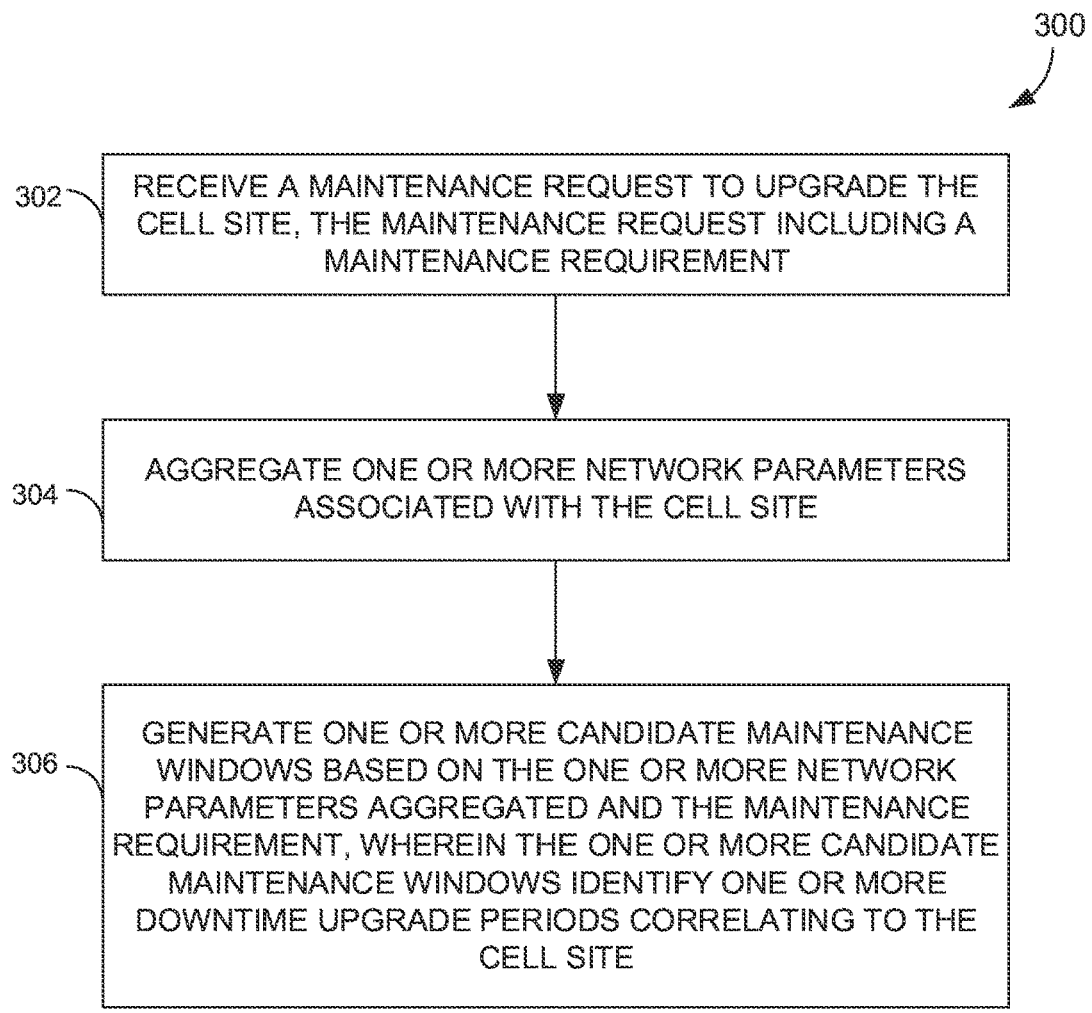
FIG. 3 depicts a flowchart of an exemplary method for generating one or more candidate maintenance windows of at least one cell site of a telecommunications network in accordance with an example embodiment.

FIG. 3 depicts a flow diagram of an exemplary method 300 for generating one or more candidate maintenance windows of at least one cell site of a telecommunications network, in accordance with implementations of the present disclosure. Initially at block 302 a maintenance request to upgrade the at least one cell site is received by the service management system. The maintenance request (e.g. a request to upgrade a cell site) may include at least one maintenance requirement (e.g., at least one schedule requirement or any other suitable requirement). In some embodiments, the schedule requirement may include one or more timing inputs (e.g., upgrade window, upgrade shutout, priority timing, maximum upgrade timing, etc.). The maintenance requirement may include one or more footprint requirements (e.g., a RAN input, footprint input, and/or rollback requirement). The maintenance request may be received via a user interface.

At block 304, one or more network parameters associated with the at least one cell site is aggregated. The one or more network parameters may include one or more performance indicators (e.g., a key performance indicator (KPI) such as, but not limited to, voice traffic, data traffic, and/or any other suitable indicator). The voice traffic may be based on one or more calls (e.g., E911, VoLTE, ViLTE, VoNR, and/or ViNR calls), one or more erlangs (e.g., VoLTE, ViLTE, VoNR, and/or ViNR erlangs), one or more drops (e.g, VoLTE, ViLTE, VoNR, and/or ViNR drops) and/or any other suitable voice traffic indicator. The data traffic may be based on downlink traffic volume (e.g., LTE and/or NR), uplink traffic volume (e.g., LTE and/or NR), average user device throughput (e.g., LTE and/or NR), downlink PRB utilization, uplink PRB utilization, and/or any other suitable data traffic indicator.

In some embodiments, one or more candidate maintenance windows are generated based on the one or more network parameters aggregated and the maintenance requirement at block 306. In some examples, the one or more candidate maintenance windows may identify one or more downtime upgrade periods correlating to at least one cell site. In some embodiments, the service management system may be structured to generate one or more confidence indicators that may update (e.g., update in value or weight) as the candidate maintenance window approaches.

Figure 4:
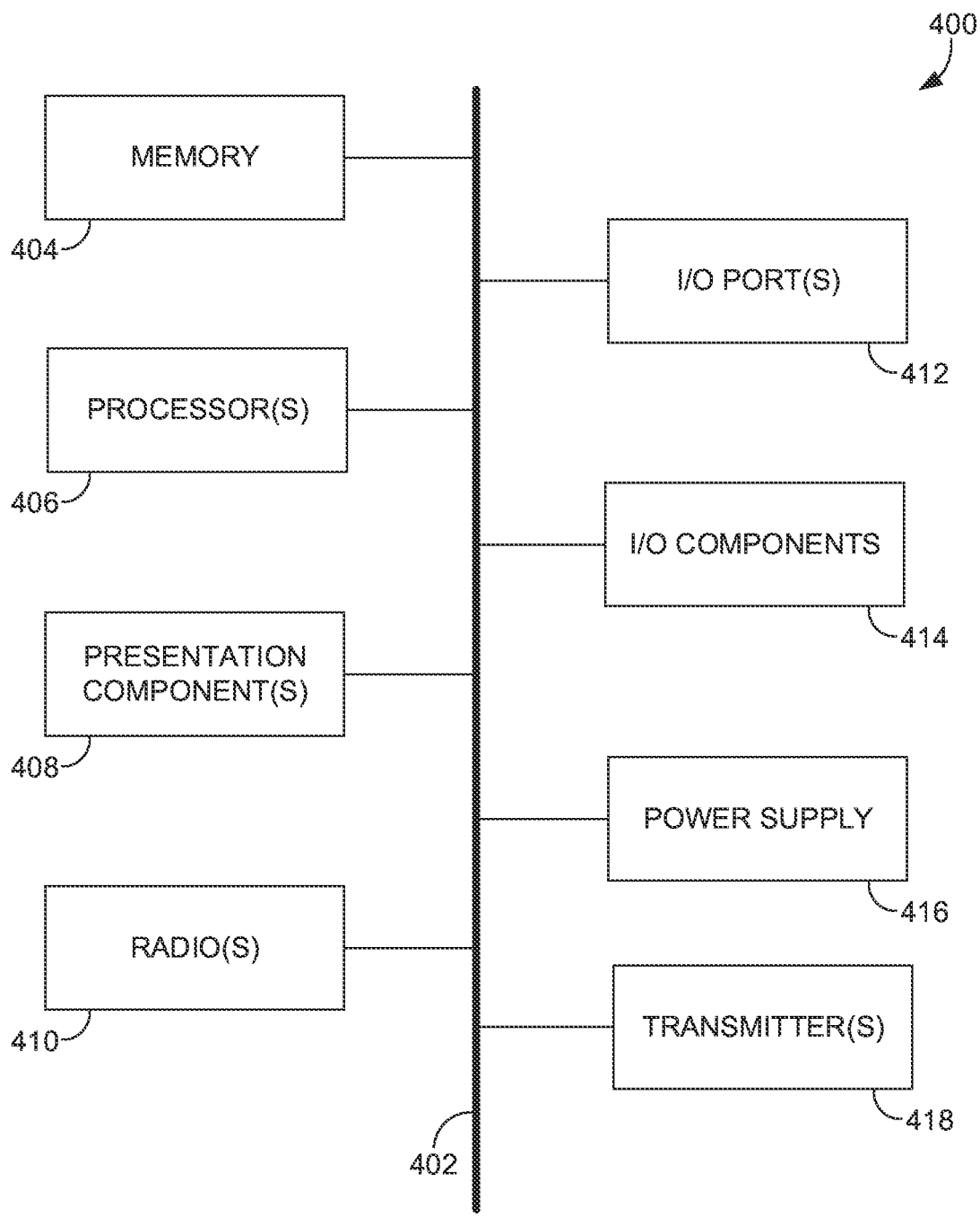
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be UE capable of two-way wireless communications with an access point. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 410, input/output (I/O) port(s) 412, input/output (I/O) component(s) 414, power supply 416, and/or transmitter(s) 418. Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 414. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 410 represents one or more radios that facilitate communication with a wireless telecommunication network. For example, radio(s) 410 may be connected to one or more antenna elements through a physical path. Illustrative wireless telecommunications technologies include CDMA, GPRS, TDMA, GSM, and the like. Radio(s) 410 might additionally or alternatively facilitate other types of wireless communications including Wi-Fi, WiMAX, 3G, 4G, LTE, mMIMO, 5G, 6G, NR, VoLTE, and/or other VoIP communications. As can be appreciated, in various embodiments, radio(s) 410 may be configured to concurrently support multiple technologies, as previously discussed herein. As such, each of many radio(s) 410 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 412 may take a variety of forms. Exemplary I/O ports 412 may include a USB jack, a stereo jack, an infrared port, a firewire port, other proprietary communications ports, and the like. Input/output (I/O) components 414 may comprise keyboards, microphones, speakers, touchscreens, and/or any other item usable to directly or indirectly input data into the computing device 400.

Power supply 416 may include batteries, fuel cells, and/or any other component that may act as a power source to supply power to the computing device 400 or to other network components, including through one or more electrical connections or couplings. Power supply 416 may be configured to selectively supply power to different components independently and/or concurrently.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A method for generating one or more candidate maintenance windows of at least one cell site of a telecommunications network, the method comprising:
receiving, by a service management system communicatively coupled to at least one cell site, a maintenance request to upgrade the at least one cell site, the maintenance request comprising a maintenance requirement;
aggregating one or more network parameters associated with the at least one cell site;
generating one or more candidate maintenance windows based on the one or more network parameters aggregated and the maintenance requirement, wherein the one or more candidate maintenance windows identify one or more downtime upgrade periods correlating to the at least one cell site; and
generating one or more confidence indicators, for each of the one or more candidate windows identifying one or more downtime upgrade periods correlating to the at least one cell site, indicating a value of likelihood that the one or more candidate maintenance windows will not result in a reduction of one or more performance indicators for the at least one cell site.

2. The method of claim 1, wherein the maintenance requirements comprise at least one of a schedule requirement or footprint requirement.

3. The method of claim 1, wherein the one or more network parameters comprise one or more performance indicators.

4. The method of claim 3, wherein the one or more performance indicators comprise at least one of data traffic or voice traffic.

5. The method of claim 1, wherein the one or more confidence indicators is a dynamic indicator that is updated in weight as the one or more candidate maintenance windows approaches.

6. The method of claim 1, wherein the service management system is structured to generate a pre-check.

7. The method of claim 1, wherein the service management system is structured to generate a post-check.

8. The method of claim 1, wherein the one or more candidate maintenance windows are generated in real-time or near real-time.

9. The method of claim 1, wherein the cell site is operable based on a RAN network.

10. The method of claim 1, wherein the cell site comprises the service management system.

11. Computer-readable storage media having computer-executable instructions embodied thereon that, when executed by one or more processors, cause the processors to:
receive, by a service management system communicatively coupled to at least one cell site, a maintenance request to upgrade the at least one cell site, the maintenance request comprising a maintenance requirement;
aggregate one or more network parameters based on the at least one cell site; and
generate one or more candidate maintenance windows and one or more confidence indicators based on the one or more network parameters aggregated and the maintenance requirement, wherein the one or more candidate maintenance windows identify one or more downtime upgrade periods correlating to the at least one cell site, and wherein the one or more confidence indicators for each of the one or more candidate windows identifying one or more downtime upgrade periods correlating to the at least one cell site indicates a value of likelihood that the one or more candidate maintenance windows results in a reduction of one or more performance indicators for the at least one cell site.

12. The computer-readable storage media of claim 11, wherein the maintenance requirements comprise at least one of a schedule requirement or footprint requirement.

13. The computer-readable storage media of claim 11, wherein the one or more network parameters comprise one or more performance indicators.

14. The computer-readable storage media of claim 13, wherein the one or more performance indicators comprise at least one of data traffic or voice traffic.

15. The computer-readable storage media of claim 11, wherein the one or more candidate maintenance windows are generated in real-time or near real-time.

16. A system for generating one or more candidate maintenance windows of at least one cell site of a telecommunications network, the system comprising:
a user device; and
a cell site communicatively coupled to a service management system and the user device, the service management system structured to:
receive a maintenance request to upgrade the cell site, the maintenance request comprising a maintenance requirement;
aggregate one or more network parameters based on the cell site;
generate one or more candidate maintenance windows based on the one or more network parameters aggregated and the maintenance requirement, wherein the one or more candidate maintenance windows identify one or more downtime upgrade periods correlating to the cell site; and
generating one or more confidence indicators, for each of the one or more candidate windows identifying one or more downtime upgrade periods correlating to the at least one cell site, indicating a value of likelihood that the one or more candidate maintenance windows will not result in a reduction of one or more performance indicators for the at least one cell site.

17. The system of claim 16, wherein the maintenance requirements comprise at least one of a schedule requirement or footprint requirement.

18. The system of claim 16, wherein the one or more network parameters comprise one or more performance indicators, and wherein the one or more performance indicators comprise at least one of data traffic or voice traffic.

19. The system of claim 16, wherein the one or more confidence indicators is a dynamic indicator that is updated as the one or more candidate maintenance windows approaches.

* * * * *